United States Patent [19]

Ichitani

[11] Patent Number: 4,951,158

[45] Date of Patent: Aug. 21, 1990

[54] IMAGE SCANNER APPARATUS WITH SCANNING MAGNIFICATION CORRECTING FUNCTION

[75] Inventor: Tetsuro Ichitani, Mishima, Japan

[73] Assignee: Tokyo Electric Co., Ltd., Tokyo, Japan

[21] Appl. No.: 384,262

[22] Filed: Jul. 21, 1989

[30] Foreign Application Priority Data

Jul. 28, 1988 [JP] Japan ................................. 63-189160

[51] Int. Cl.$^5$ .......................................... H04M 1/393
[52] U.S. Cl. ..................................... 358/451; 358/453
[58] Field of Search ......................... 358/451, 453, 77; 382/47

[56] References Cited

U.S. PATENT DOCUMENTS

| | | |
|---|---|---|
| 4,122,438 | 10/1978 | Bird . |
| 4,471,386 | 9/1984 | Tuhro .................... 358/453 |
| 4,558,374 | 12/1985 | Kurata et al. .......................... 358/453 |
| 4,580,171 | 4/1986 | Arimoto .............................. 358/451 |
| 4,731,865 | 3/1988 | Sievenpiper . |
| 4,811,109 | 3/1989 | Shimizu ............................... 358/453 |

FOREIGN PATENT DOCUMENTS

| | | |
|---|---|---|
| 55-6662 | 1/1980 | Japan . |
| 56-16286 | 2/1981 | Japan . |
| 59-53977 | 3/1984 | Japan . |

*Primary Examiner*—Edward L. Coles, Sr.
*Attorney, Agent, or Firm*—Frishauf, Holtz, Goodman & Woodward

[57] ABSTRACT

A scanner unit optically scans an original in a first direction to obtain an optical image. A mark is provided with a predetermined distance within a range in a second direction perpendicular to the first direction. The range is a range which can be scanned by the scanner unit. A line sensor is arranged in the second direction to read the optical image line by line in cooperation with the scanner unit. A converter converts a read output from the line sensor into digital data. An instruction section instructs to read the mark to the scanner unit and the line sensor prior to reading of the original. A distance calculating section calculates distance data corresponding to the predetermined distance of the mark in accordance with the digital data from the converter when the scanner unit and the line sensor cooperate to read the mark in accordance with an instruction from the instruction switch. A correction data calculating section calculates correction data corresponding to a difference between reference data and the distance data calculated by the distance calculating section. The correction data represents the number of bits of data extraction or addition corresponding to the difference. A read magnification correcting section executes bit extraction from or addition to the digital data from the converter in accordance with the number of bits represented by the correction data output from the correction data calculating section. A read magnification defined by the scanner unit and the line sensor is corrected to a defined read magnification corresponding to the reference data.

18 Claims, 8 Drawing Sheets

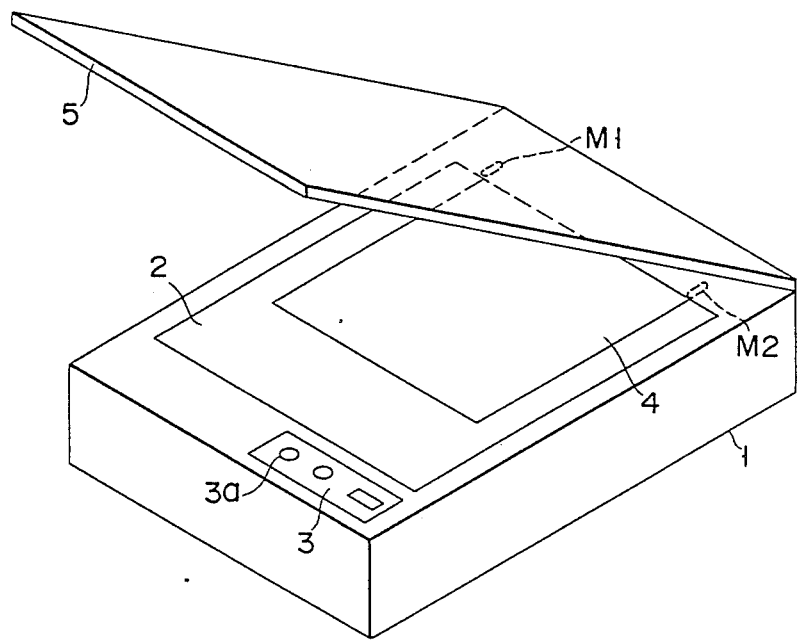
F I G. 1
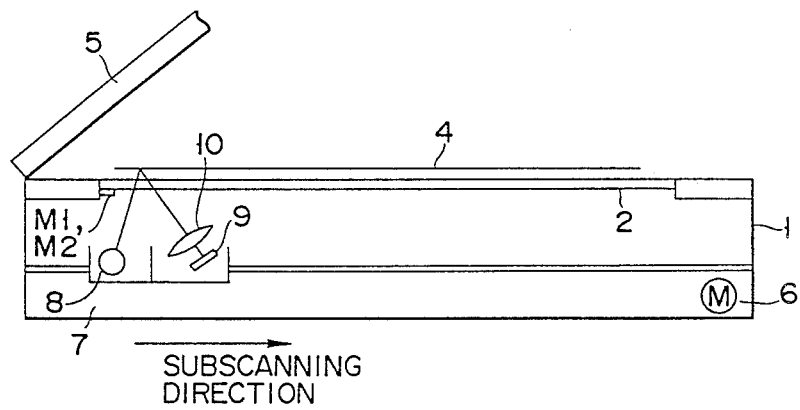
F I G. 2

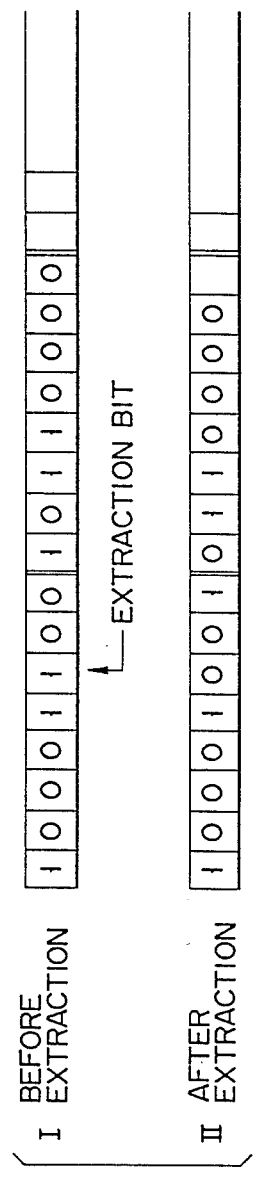
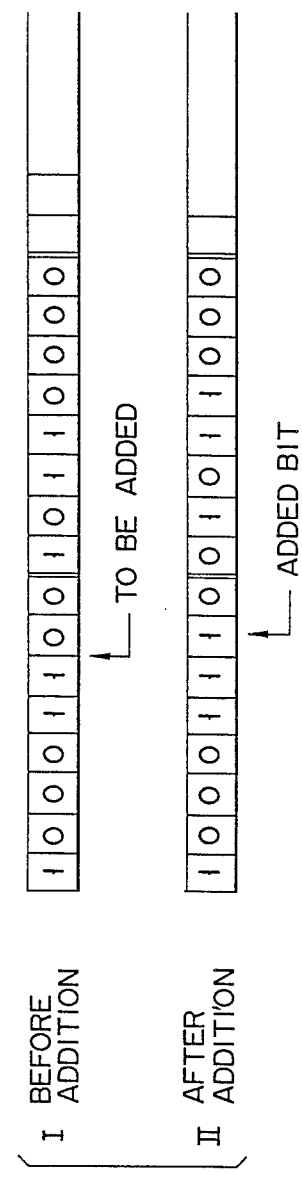

|  | | | | | |
|---|---|---|---|---|---|
| 1ST LINE | 00000000 | 00000000 | 00000000 | 00000000 | ------ |
| 2ND LINE | 00000000 | 00000000 | 00000000 | 00000000 | ------ |
| 3RD LINE | 00000000 | 00000000 | 00000011 | 11111111 | ------ |
| 4TH LINE | 00000000 | 00000000 | 00000011 | 11111111 | ------ |

IMAGE SCANNER APPARATUS WITH SCANNING MAGNIFICATION CORRECTING FUNCTION

BACKGROUND OF THE INVENTION

1. Field of the Invention

The present invention relates to an image scanner apparatus for reading image information of an original set on an original read table line by line and outputting digital image data in units of lines and, more particularly, to an image scanner apparatus having improved read magnification precision in a main scanning direction.

2. Description of the Related Art

In a conventional image scanner apparatus for reading two-dimensional image information of an original and sending the read data to a host computer, an original placed on an original read table is generally irradiated with light from a light source, and light reflected by the original is focused on a line sensor by an optical lens. An image of the original set on the original read table is reduced or enlarged by the optical lens at a predetermined magnification, and a reduced or enlarged image is focused on the line sensor. A relationship (magnification) between a size of the original in its widthwise direction and a size of an image formed on the line sensor in its widthwise direction is set to satisfy a predetermined relationship (i.e., a defined magnification).

The defined magnification is obtained by appropriately adjusting a distance between the original read table and a carrier, a distance between the original read table and the optical lens, a distance between the optical lens and the line sensor, and mounting angles of the respective optical components. However, it is time-consuming and cumbersome to obtain an accurate magnification upon adjustment of the distances and angles described above.

The line sensor comprises 2,000 or more unit photoelectric elements (each corresponds to one pixel) in a line. It is impossible to cause the defined magnification to fall within an allowance of about several pixels by only adjustment of the mounting positions of the optical components described above. As a result, a total number of pixels (bits) of digital image data output from the image scanner apparatus to the host computer, in units of lines, does not necessarily correspond to the defined number of pixels set in correspondence to a sheet size such as a A4 or B5.

SUMMARY OF THE INVENTION

It is, therefore, an object of the present invention to provide a new and improved image scanner apparatus with a scanning magnification correcting function.

It is another object of the present invention to provide an image scanner apparatus wherein a distance between a pair of marks formed near a read start position of an original read table is read to correct a read magnification using the mark distance so as to set magnification precision between an original and digital image data to be higher than precision of mounting adjustment of optical components, thereby accurately and easily correcting an actual magnification to a defined magnification and hence improving overall read precision.

According to one aspect of the present invention, there is provided an image scanner apparatus comprising:

scanning means for optically scanning an original in a first direction to obtain an optical image;

mark means provided with a predetermined distance therebetween within a range in a second direction perpendicular to the first direction, the range being able to be scanned by the scanning means;

line sensor means arranged in the second direction to read the optical image line by line in cooperation with the scanning means;

converting means for converting a read output from the line sensor means into digital data;

instructing means for instructing to read the mark means to the scanning means and the line sensor means prior to reading of the original;

distance calculating means for calculating distance data corresponding to the predetermined distance of the mark means in accordance with the digital data from the converting means when the scanning means and the line sensor means cooperate to read the mark means in accordance with an instruction from the instructing means;

correction data calculating means for calculating correction data corresponding to a difference between reference data and the distance data calculated by the distance calculating means, the correction data representing the number of bits of data extraction or addition corresponding to the difference; and read magnification correcting means for executing bit extraction from or addition to the digital data from the converting means in accordance with the number of bits represented by the correction data output from the correction data calculating means, so that a read magnification defined by the scanning means and the line sensor means is corrected to a defined read magnification corresponding to the reference data.

According to another aspect of the present invention, there is provided an image scanner apparatus for irradiating an original on an original read table with light from a light source mounted on a carrier of the original read table to cause a line sensor on the carrier to read image information of the original line by line through an optical lens in a main scanning direction, and outputting digital image data in units of lines, the carrier being moved in a subscanning direction of the original read table, comprising:

a pair of marks spaced apart from each other near a read start position of the original read table in the main scanning direction;

mark reading means for reading one-line image data including the pair of marks;

mark distance calculating means for calculating an intermark distance represented by the number of pixels of the line sensor on the basis of the image data output from the mark reading means;

correction pixel count calculating means for calculating the number of correction pixels corresponding to a difference between a defined intermark distance and the intermark distance calculated by the mark distance calculating means; and data count correcting means for bit-extracting or bit-adding pixels by the number of correction pixels from or to the one-line digital image data of the original which is read during movement of the carrier in the subscanning direction, thereby correcting the number of pixels to the defined number of pixels.

In the image scanner apparatus having the arrangement described above, when an original read start instruction is input, the one-line image data including the pair of marks is read to obtain the intermark distance represented by the number of pixels on the image data. The number of correction pixels is calculated by a ratio of the calculated intermark distance and the defined intermark distance. The number of correction pixels is subtracted from or added to the one-line digital image data obtained upon actual reading of the original. Therefore, a total number of pixels of the digital image data to be sent to, e.g., a host computer can be adjusted to be the defined number of pixels. That is, the read magnification is corrected to the defined read magnification.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention, in which FIGS. 1 to 11 show an image scanner apparatus according an embodiment of the present invention, in which;

FIG. 1 is a perspective view showing the outer appearance of the image scanner apparatus;

FIG. 2 is a sectional view showing an arrangement of the image scanner apparatus shown in FIG. 1;

FIG. 3 is a plan view showing the main part of the image scanner apparatus shown in FIG. 1;

FIG. 4 is a detailed view showing a positional relationship between marks;

FIG. 5 is a schematic block diagram showing an electrical circuit of the image scanner apparatus shown in FIG. 1;

FIG. 6 shows a data format of main memories of a memory section shown in FIG. 5;

FIGS. 7 to 9 are flow charts showing operations of the image scanner apparatus;

FIGS. 10 and 11 show bit formats of digital image data before and after adjustment;

DETAILED DESCRIPTION OF THE PREFERRED EMBODIMENTS

Figure 3:
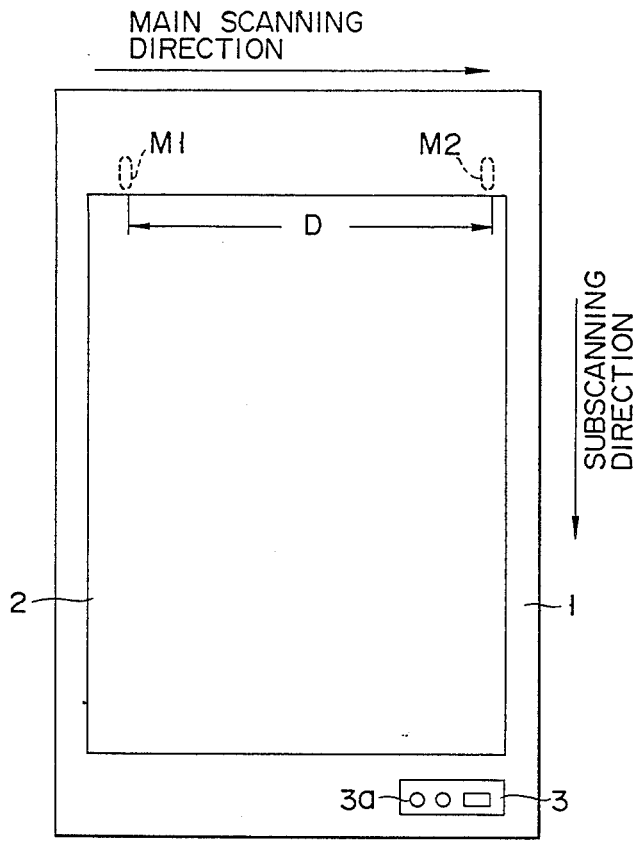

Reference will now be made in detail to the presently preferred embodiment of the invention as illustrated in the accompanying drawings, in which like reference characters designate like or corresponding parts throughout the several drawings.

FIG. 1 is a perspective view showing the outer appearance of an image scanner apparatus according to an embodiment of the present invention.

A rectangular window is formed in the upper surface of a substantially box-like case 1, and an original read table 2 made of glass or the like is fitted in the rectangular window. A pair of marks M1 and M2 (to be described later) are formed on the original read table 2. An operation panel 3 including various operation keys such as a read start key 3a is arranged at the front portion of the original read table 2. The original read table 2 is covered with a cover 5 when an original 4 is set on the table 2.

FIG. 2 is a schematic sectional view showing an arrangement of the image scanner apparatus. A carrier 7 which can be controlled and moved by a carrier motor 6 in a subscanning direction (longitudinal direction) indicated by an arrow is arranged in the case 1 below the original read table 2. The carrier 7 includes a light source 8 constituted by, e.g., a fluorescent lamp, a CCD line sensor 9 having a large number of photoelectric elements, and an optical lens 10 for focusing light emitted from the light source 8 and reflected by the original 4 on the line sensor 9.

An operation of the image scanner apparatus having the above arrangement will be briefly described below. The original 4 is set on the original read table 2 and covered with the cover 5. When an operator operates the read start key 3a in the operation panel 3, the light source 8 is turned on to illuminate the original 4. Light reflected by the original 4 is focused on the line sensor 9 through the optical lens 10. At the same time, the carrier motor 6 is started to move the carrier 7 in the subscanning direction. During movement of the carrier 7 in the subscanning direction, the carrier 7 causes the line sensor 9 to read image information of the original 4 line by line in the main scanning direction (widthwise direction). The read image data is converted into digital signal by an A/D converter (to be described later). The digital signal is supplied to a digital processing circuit for performing gammacorrection, dither correction, and binary processing. The digital processing circuit outputs digital image signal to an external host computer (not shown).

FIG. 3 is a plan view of the case 1 of the image scanner apparatus shown in FIG. 1 when the cover 5 is open.

Figure 4:
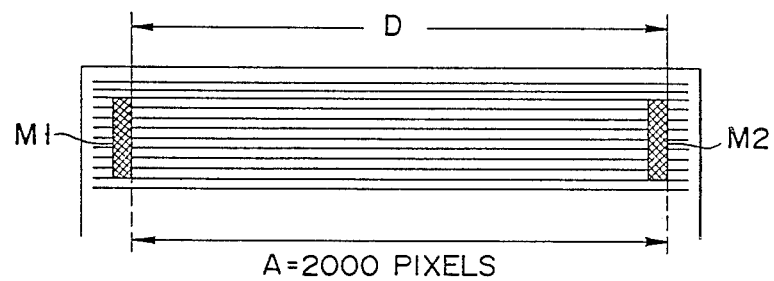

In this embodiment, as shown in FIG. 3, the pair of marks M1 and M2 are spaced apart from each other by a distance D and are formed in a window edge adjacent to the upper edge of the original read table 2 fitted in the upper window of the case 1. The intermark distance D on the original read table 2 corresponds to a defined intermark distance A (=2,000 pixels) represented by the number of pixels of the line sensor 9 when the mounting positional relationship between the light source 8, the optical lens 10, the line sensor 9, and the original read table 2 is ideal, i.e., when a defined magnification is obtained, as shown in FIG. 4.

Figure 5:
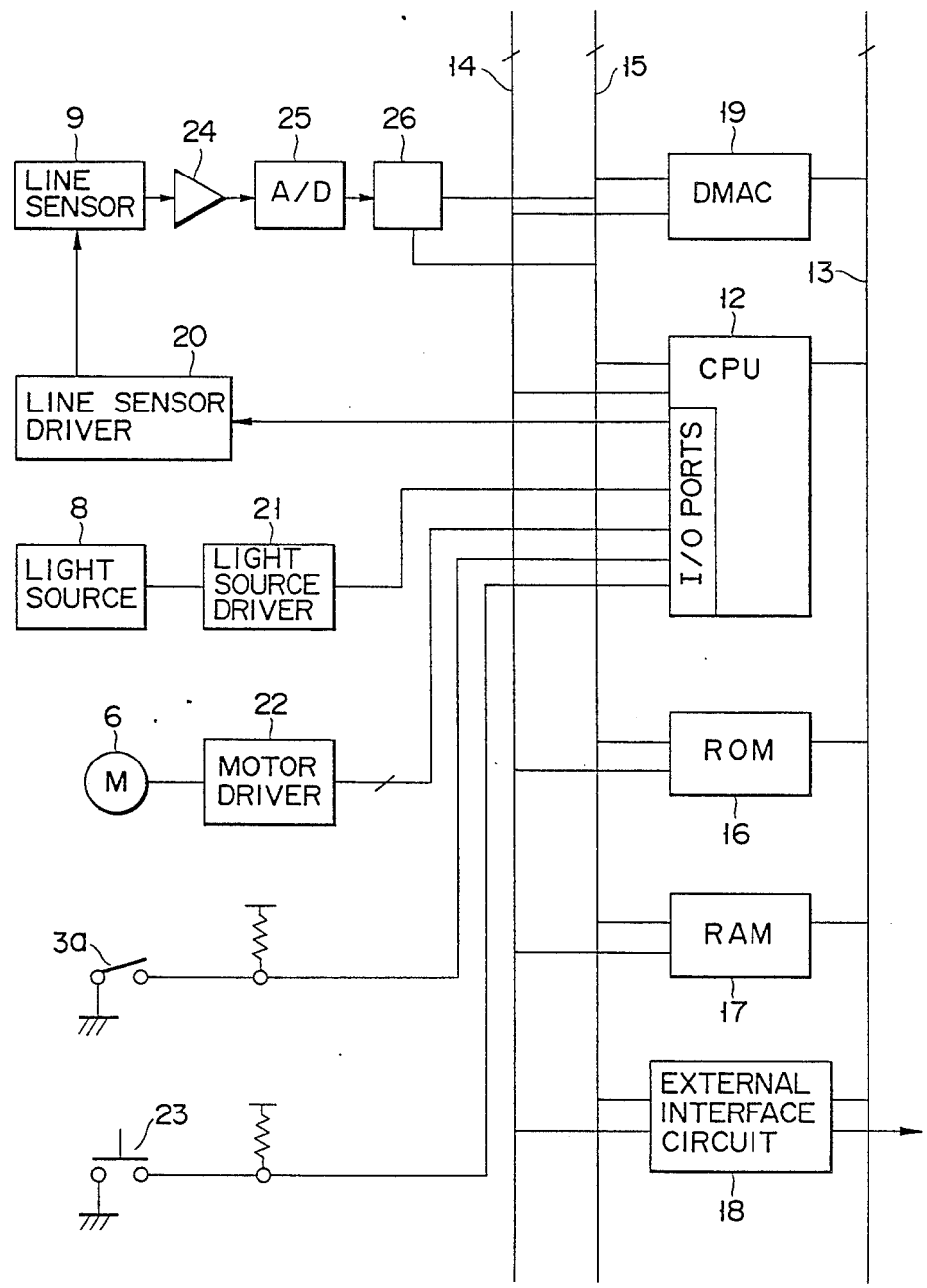

FIG. 5 is a schematic block diagram showing an electrical circuit of the image scanner apparatus shown in FIG. 1. A central processing unit (CPU) 12 having I/O ports controls a read-only memory (ROM) 16, a random access memory (RAM) 17, an external interface circuit 18, and a direct memory access controller (DMAC) 19 through an address bus 13, a data bus 14, and a control bus 15. The ROM 16 stores control programs. The RAM 17 stores various variable data. The external interface circuit 18 outputs digital image data of the read original 4 in units of lines to the external host computer. The DMAC 19 directly transfers each one-line digital image data to the external interface circuit 18.

The microprocessor (CPU) 12 is also connected to a line sensor driver 20 for outputting a read clock signal to the line sensor 9 through the I/O ports, a light source driver 21 for turning on the light source 8, a motor driver 22 for driving the carrier motor 6 comprising a stepping motor for controlling and moving the carrier 7 in which the light source 8, the optical lens 10, and the line sensor 9 are mounted, the read start key 3a arranged in the operation panel 3, and a limit switch 23 for detecting that the carrier 7 has reached a reference position outside the pair of marks M1 and M2.

One-line analog image data output from the line sensor 9 in synchronism with a read clock signal from the line sensor driver 20 is amplified by an amplifier 24. The amplified signal is converted into digital image data by an A/D (analog/digital) converter 25. The digital signal is transferred to a digital processing circuit 26. The digital signal is subjected to binary processing including gamma-correction and dither correction in the digital processing circuit 26. Pixels are added to or subtracted from the processed data by the number of correction pixels under the control of the CPU 12. The corrected digital image data is sent to, e.g., an external host computer through the DMAC 19 and the external interface circuit 18.

Figure 6:
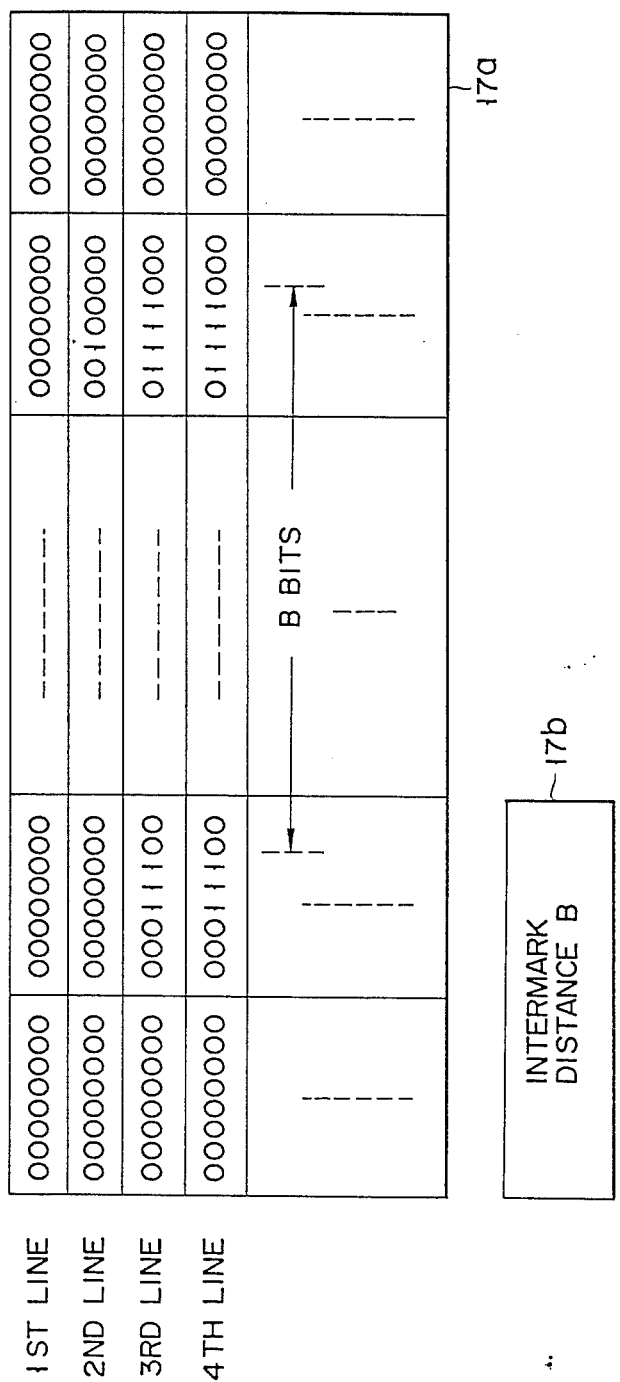

The RAM 17 includes a data memory 17a for temporarily storing a plurality of lines of digital image data including the pair of marks M1 and M2, and a distance memory 17b for storing the calculated intermark distance B, as shown in FIG. 6.

When a power switch (not shown) of the apparatus is turned on, the CPU 12 executes an original read main routine (FIG. 7) in accordance with a control program from the ROM 16. When the original 4 to be read is set on the original read table 2, the cover 5 is closed, and the read start key 3a of the operation panel 3 is operated in step P1 in FIG. 7, the flow advances to step P2, and the CPU 12 executes mark detection processing, a detail of which is shown in FIG. 8.

Figure 8:
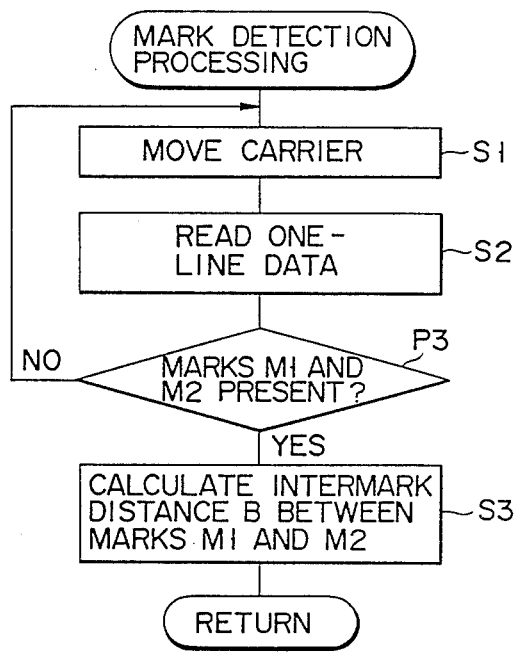

When mark detection processing is started in FIG. 8, the CPU 12 drives the carrier motor 6 through the motor driver 22 to move the carrier 7 located at the reference position outside the marks M1 and M2 by one pixel (one step) in the subscanning direction (step S1). The CPU 12 reads one-line image data at this time through the line sensor 9 and stores the read data in the first-line area of the data memory 17a of the RAM 17 (step S2). The CPU 12 determines in step P3 whether detection data of the marks M1 and M2 is included in the read one-line data. In practice, as shown in FIG. 6, the marks M1 and M2 are detected when three successive bits of "1" are detected in one-line data.

When the pair of marks M1 and M2 are detected in step P3, the CPU 12 calculates the intermark distance B represented by the number of pixels from the mark M1 to the mark M2 (step S3). The CPU 12 stores the calculated intermark distance B in the distance memory 17b. The flow then returns to the original read main routine in FIG. 7.

Figure 7:
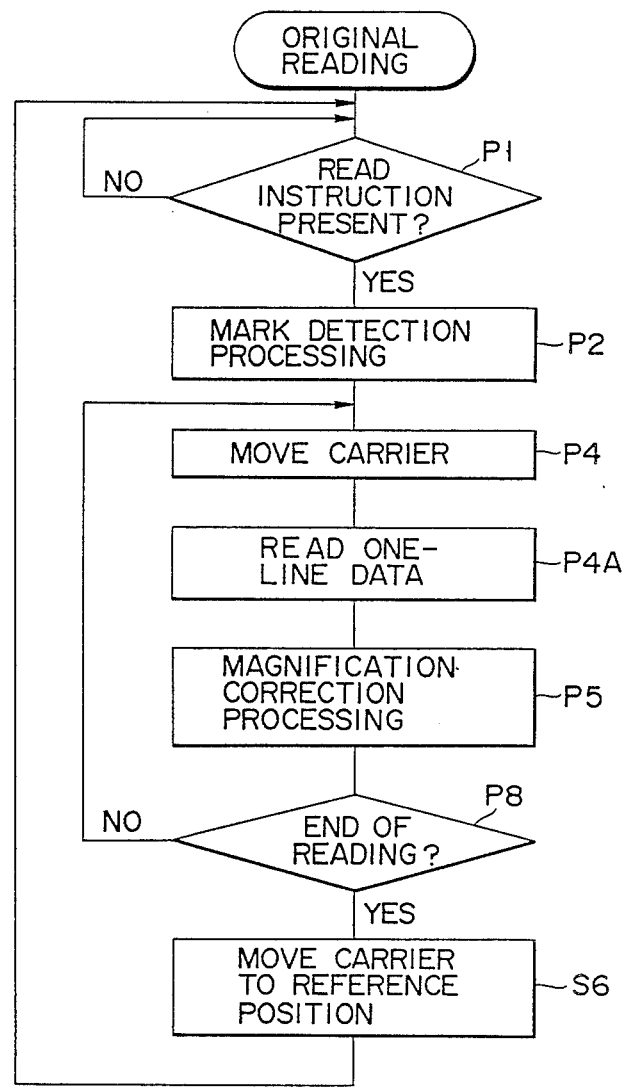

When mark detection processing in step P2 in FIG. 7 is completed, the CPU 12 moves the carrier 7 by one pixel in the same manner as described above and causes the line sensor 9 to read one-line image data of the original 4 at this time (step P4A). The read one-line digital image data is input to the RAM 17. In step P5, the CPU 12 executes magnification correction processing, a detail of which is shown in FIG. 9.

Figure 9:
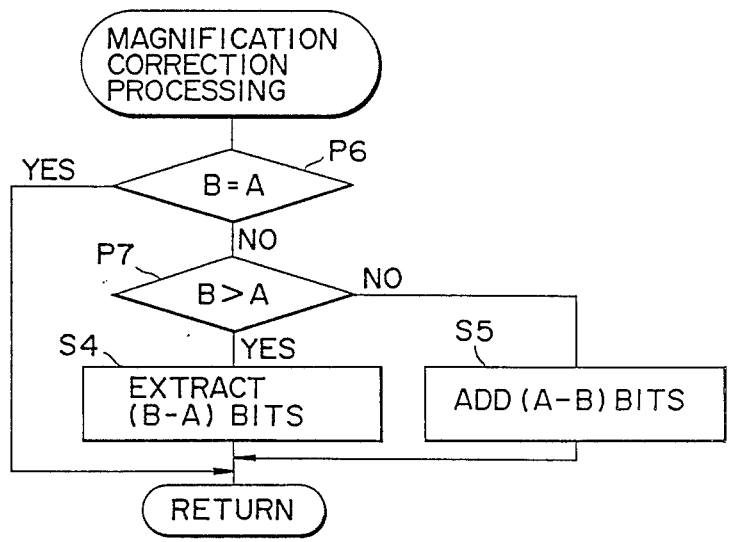

When the magnification correction processing in FIG. 9 is started, in step P6, the CPU 12 compares the read intermark distance B with a reference intermark distance A pre-stored in the ROM 16. If a coincidence is established, the input digital image data need not be corrected, and the digital image data is directly output to the external host computer through the DMAC 19 and the external interface circuit 18. The flow then returns to the original read main routine in FIG. 7.

If the distance A is not equal to the distance B in step P6, the CPU 12 compares which one of the distances A and B is longer in step P7. If the read intermark distance B is longer than the defined intermark distance A, the CPU 12 calculates the number of correction pixels (B - A) represented by the difference. The CPU 12 extracts bit data corresponding to the number of correction pixels (B - A) from the input digital image data, as indicated by I and II in FIG. 10 (step S4). If the number of correction pixels (B - A) is small, data digits to be extracted may be fixed. However, when the number of correction pixels (B - A) is large, data is extracted from random digits. The CPU 12 sequentially shifts the digits of the extracted data and adds dummy pixels by the number of extracted pixels so that the length of the digital image data is equal to the length of the defined number of pixels. The data count correction is thus completed, and the CPU 12 outputs the corrected digital image data to the external host computer through the DMAC 19 and the external interface circuit 18. The flow then returns to the original read main routine in FIG. 7.

When the read intermark distance B is shorter than the defined intermark distance A in step P7 of FIG. 9, the CPU 12 calculates the number of correction pixels (A - B) represented by the corresponding distance. As indicated in I and II in FIG. 11, bit data corresponding to the number of correction pixels (A - B) is added to the input digital image data (step S5). That is, the CPU 12 sequentially shifts the upper bit data starting from the bit to be added and adds the same data as the immediately precedence or subsequence bit to the empty bit. In this manner, the CPU 12 eliminates data corresponding to an increase in data length of the digital image data caused by addition of a predetermined number of image data in accordance with the number of input data, so that the length of the image data becomes equal to the length of the defined number of pixels. The data count correction is thus completed, and the CPU 12 outputs the corrected digital image data to the external host computer through the DMAC 19 and the external interface circuit 18. The flow returns the original read main routine in FIG. 7.

When magnification correction processing of the read digital image data is completed in step P5 of FIG. 7, the flow returns to step P4 if the carrier 7 has not reached the terminal position of the original 4 in step P8. In this case, the carrier 7 is moved by one pixel, and reading of the next one-line image data is started.

The CPU 12 determines the end of reading in step P8 when the carrier 7 reaches the terminal position of the original 4. Since reading of image information of one original 4 is completed, the carrier 7 is moved to the home position, the reference position (step S6). The CPU 12 waits until the read start key 3a is operated again in step P1.

In the image scanner apparatus arranged as described above, when the read start key 3a of the operation panel 3 is operated, one-line image data including the pair of marks M1 and M2 located near the read start position of the original read table 2 is read, and the intermark distance B of the image data is calculated. When the intermark distance B is longer than the defined intermark distance A and one-line image data of the original 4 is actually read, pixels are extracted from the one-line digital image data by the number of correction pixels corresponding to the difference between the distances A and B. However, when the intermark distance B is shorter than the defined intermark distance A, pixels are added to the one-line digital image data by the number of correction pixels corresponding to the difference between the distances A and B. Therefore, the number of data (the number of pixels) of the digital image data output to the external host computer can be equal to the defined number of data (the number of pixels) on the host computer side. That is, apparent magnification precision can be improved.

Unlike the conventional image scanner apparatus wherein the actual magnification is set to be the defined magnification by positional adjustment of the respective optical components such as the light source 8, the optical lens 10, the line sensor 9, and the original read table 2, magnification precision can be greatly improved.

In the image scanning apparatus as has been described above, the distance between the pair of marks formed near the original read table is read, and the number of correction pixels is calculated on the basis of the relationship between the read mark distance and the reference mark distance. The total number of pixels of the actually output digital image data is corrected by using the calculated number of correction pixels. Therefore, apparent magnification precision can be improved. The magnification between the original and the output digital image data can be accurately set to be the defined magnification higher than mounting precision of the optical components. Therefore, read precision of the apparatus as a whole can be greatly improved.

The present invention is not limited to the particular embodiment described above. Various changes and modifications may be made without departing from the scope of the invention.

The marks are read upon every operation of the read start key 3a to correct the output data length in the above embodiment. The above read operation may be performed at least upon every power-on operation of the scanner apparatus.

Figures 12, 13:
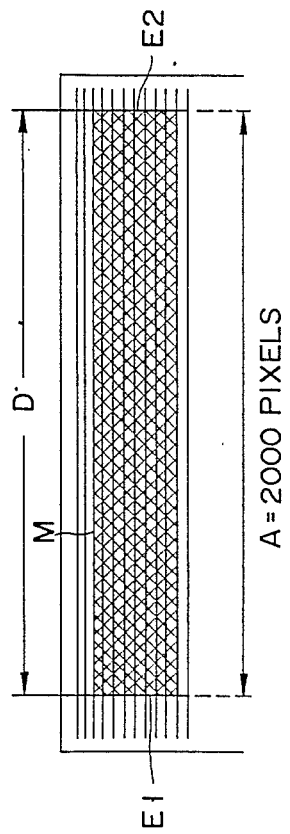
FIG. 12 is a view showing a modified mark.
FIG. 13 shows a data format stored in a memory when the mark of FIG. 12 is used substituting that of FIG. 4.

A line mark M having the distance D may be used substituting the pair of marks M1 and M2, as shown in FIG. 12. In this case, a mark distance between both edges of the line mark M is detected substantially. The data memory 17a' stores data corresponding to the detected mark distance in form bits of "1" continuously represented by the number of pixels from both edges of the line mark M, as shown in FIG. 13. The CPU 12 calculates the mark distance B as a read mark distance, based on the data stored in the memory 17a', and stores the calculated mark distance B in the distance memory 17b. Subsequently, CPU 12 executes the same processing as the mark detection processing as above mentioned.

Furthermore, in adding the data of bits number corresponding to the number of correction pixels (B - A), CPU 12 may be added data obtained by executing AND or OR to data of the precedence or subsequence bit as a bit to be added in the digital data.

What is claimed is:

1. An image scanner apparatus comprising:
   scanning means for optically scanning an original in a first direction to obtain an optical image;
   mark means provided with a predetermined distance within a range in a second direction perpendicular to the first direction, the range being able to be scanned by said scanning means;
   line sensor means arranged in the second direction to read the optical image line by line in cooperation with said scanning means;
   converting means for converting a read output from said line sensor means into digital data;
   instructing means for instructing to read said mark means to said scanning means and said line sensor means prior to reading of the original;
   distance calculating means for calculating distance data corresponding to the predetermined distance of said mark means in accordance with the digital data from said converting means when said scanning means and said line sensor means cooperate to read said mark means in accordance with an instruction from said instructing means;
   correction data calculating means for calculating correction data corresponding to a difference between reference data and the distance data calculated by said distance calculating means, the correction data representing the number of bits of data extraction or addition corresponding to the difference; and
   read magnification correcting means for executing bit extraction from or addition to the digital data from said converting means in accordance with the number of bits represented by the correction data output from said correction data calculating means, so that a read magnification defined by said scanning means and said line sensor means is corrected to a defined read magnification corresponding to the reference data.

2. An apparatus according to claim 1, wherein said scanning means comprises a carrier movable below an original support surface, a light source arranged in association with said carrier, and an optical lens, said light source being arranged to radiate light toward an original support direction, and said optical lens being arranged to focus light reflected from the original support direction on said line sensor means.

3. An apparatus according to claim 1, wherein said mark means are provided below said original support surface at a reference position near a scanning start position in the first direction of said scanning means.

4. An apparatus according to claim 1, wherein the distance of said mark means corresponds to a defined distance represented by a total number of pixels of said line sensor means, the total number being defined such that the read magnification defined by said scanning means and said line sensor means becomes the defined magnification.

5. An apparatus according to claim I, wherein said instructing means includes means for supplying a read start instruction for the original.

6. An apparatus according to claim 1, further comprising detecting means for detecting that said scanning means has reached the reference position.

7. An apparatus according to claim 6, wherein said instructing means responds to an output from said detecting means.

8. An apparatus according to claim 1, wherein said distance calculating means calculates the distance data when a predetermined number of successive read bits are present in one line of the digital data.

9. An apparatus according to claim 1, wherein said read magnification correcting means extracts fixed bits from the digital data.

10. An apparatus according to claim 1, wherein said read magnification correcting means extracts random bits from the digital data.

11. An apparatus according to claim 1, wherein said read magnification correcting mean adds data associated with data of the near bit as a bit to be added in the digital data.

12. An apparatus according to claim 1, further comprising storage means for storing the distance data of said mark means and the correction data.

13. An apparatus according to claim 1, further comprising transfer means for transferring the digital data corrected to the defined read magnification by said read magnification correcting means to the outside of said apparatus.

14. An apparatus according to claim 1, wherein said read magnification correcting means includes means for sequentially shifting data of digits after data is extracted and adding dummy data by the number of extracted data so that a data length is set to be equal to a defined data length.

15. An apparatus according to claim 1, wherein said read magnification correcting means includes means for eliminating data corresponding to an increase in data length caused by an addition of a predetermined number of data so that a data length is set to be equal to a defined data length.

16. An apparatus according to claim 1, wherein said mark means includes a pair of marks which are spaced apart from each other near a read start position in the first direction.

17. An apparatus according to claim 1, wherein said mark means includes a line mark which is provided near a read start position in the first direction.

18. An image scanner apparatus for irradiating an original on an original read table with light from a light source mounted on a carrier of said original read table to cause a line sensor on said carrier to read image information of the original line by line through an optical lens in a main scanning direction, and outputting digital image data in units of lines, said carrier being moved in a subscanning direction of said original read table, comprising:

a pair of marks spaced apart from each other near a read start position of said original read table in the main scanning direction;

mark reading means for reading one-line image data including the pair of marks;

mark distance calculating means for calculating an intermark distance represented by the number of pixels of said line sensor on the basis of the image data output from said mark reading means;

correction pixel count calculating means for calculating the number of correction pixels corresponding to a difference between a defined intermark distance and the intermark distance calculated by said mark distance calculating means; and data count correcting means for bit-extracting or bit-adding pixels by the number of correction pixels from or to the one-line digital image data of the original which is read during movement of said carrier in the subscanning direction, thereby correcting the number of pixels to the defined number of pixels.

* * * * *